United States Patent
Seo

(10) Patent No.: US 7,463,686 B2
(45) Date of Patent: Dec. 9, 2008

(54) METHOD FOR DETERMINING MOTION VECTOR AND MACROBLOCK TYPE

(75) Inventor: Kwang Deok Seo, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 1067 days.

(21) Appl. No.: 10/750,932

(22) Filed: Dec. 30, 2003

(65) Prior Publication Data

US 2004/0156436 A1 Aug. 12, 2004

(30) Foreign Application Priority Data

Jun. 3, 2003 (KR) ........................ 10-2003-0035724

(51) Int. Cl.
*H04N 7/12* (2006.01)
*H04N 11/02* (2006.01)
(52) U.S. Cl. ...................... 375/240.16; 375/240.24; 375/240.13
(58) Field of Classification Search .............. 348/14.01, 348/14.07, 14.08, 14.09, 14.1, 699, 722, 348/410, 412, 415, 416, 419, 14.11, 14.12, 348/14.13, 14.15, 402.1, 415.1, 416.1, 419.1; 375/240.02, 240.03, 240.08, 240.16, 240.12, 375/240.24, 240.1, 240.13, 240.01, 240.26, 375/240.27, 240.29; 382/232, 235, 238
See application file for complete search history.

(56) References Cited

U.S. PATENT DOCUMENTS 6,711,212 B1 * 3/2004 Lin ........................ 375/240.24
2002/0110193 A1 * 8/2002 Yoo et al. .............. 375/240.02
2003/0206588 A1 * 11/2003 Etoh et al. ............. 375/240.13
2005/0036552 A1 * 2/2005 Takahashi et al. ...... 375/240.16

OTHER PUBLICATIONS

Kwang-Deok Seo et al., Dynamic Bit-Rate Reduction Based on Frame-Skipping and Requantization for MPEG-1 to MPEG-4 Transcoder, Proceedings of the 2003 IEEE International Symposium on Circuits and Systems, ISCAS 2003 (Cat. No. 03CH7430) Bangkok, Thailand May 25-28, 2003, vol. 2, pp. II-372-II-375.
Seo K. et al., "Dynamic Bit-Rate Reduction Based on Requantization and Frame-Skipping for MPEG-1 to MPEG-4 Transcoder," IEICE Transactions on Fundmentals of Electronics, Communications and Computer Sciences, Institute of Electronics Information and Comm. Eng. Tokyo, JP, vol. E87-A, No. 4, Apr. 2004, pp. 903-911.
Kwang-Deok Seo et al., "Fast Motion Vector Refinement for MPEG-1 to MPEG-4 Transcoding with Spatial Down-Sampling in DCT Domain." Proceedings 2001 International Conference on Image Processing (Cat. No. 0 CH37205) IEEE Piscataway, NJ, USA, vol. 1, 2001, pp. 469-472.

* cited by examiner

*Primary Examiner*—Behrooz Senfi
(74) *Attorney, Agent, or Firm*—Lee, Hong, Degerman, Kang & Waimey

(57) ABSTRACT

A motion vector and macroblock type determining method is provided. The method comprises receiving a high frame-rate video stream having N frames; skipping a frame N-1; allocating a motion vector to a macroblock of frame N according to a macroblock type of the skipped frame N-1; allocating a macroblock type to a macroblock type of frame N according to a macroblock type of the skipped frame N-1; and outputting a low frame-rate video stream.

20 Claims, 4 Drawing Sheets

FIG. 3

```
if(MB_type_MB_N==SKIPPED)
   {
   if(MB_type_skipped_frame==INTRA)
      new_MB_type_MB_N=INTRA;
   else if(MB_type_skipped_frame==INTER)
      new_MB_type_MB_N=INTER;
   else
      new_MB_type_MB_N=SKIPPED;
   }
```

METHOD FOR DETERMINING MOTION VECTOR AND MACROBLOCK TYPE

CROSS-REFERENCE TO RELATED APPLICATIONS

Pursuant to 35 U.S.C. § 119(a), this application claims the benefit of earlier filing date and right of priority to the Korean Application No. 10-2003-0035724, filed on Jun. 3, 2003, the content of which is hereby incorporated by reference herein in its entirety.

BACKGROUND OF THE INVENTION

1. Field of the Invention

The present invention relates to a method for determining a motion vector and a macroblock type, and in particular to a method for determining a motion vector and a macroblock type of a frame transmitted without being skipped in a frame-rate conversion transcoder.

2. Description of the Prior Art

Video on Demand (VOD) or video streaming service is for transmitting requested video contents selectively by storing video contents as compressed file formats in a transmission server. Servicing video contents in a mobile communication network with low channel bandwidth or the Internet having variable channel bandwidth is challenging because channel bandwidth can be sharply reduced or congestion can occur.

To resolve these problems the transmission server has to reduce the video transmission frame-rate. A frame-rate conversion transcoder is utilized for adjusting a video transmission frame-rate. FIG. 1 is a block diagram illustrating operation of a general frame-rate conversion video transcoder.

In general, a moving picture such as a moving picture experts group (MPEG) is compressed through predictive encoding. In the predictive encoding, a signal value of a certain pixel is obtained by using difference between image signal values in different times. Each frame of moving picture has temporal correlation with each other. The frame is constructed with plural macroblocks. The macroblocks can be divided into inter type or intra type macroblocks.

Referring to FIG. 1, the frame-rate conversion video transcoder 10 includes a frame skipper 11 for skipping a frame in order to convert high frame-rate bit sequences into low frame-rate bit sequences; and an estimator 12 for allocating a new motion vector and a macroblock type of a following frame by using the frame skipped in the frame skipper 11 as a prediction reference.

When a certain frame is skipped in order to reduce the video transmission frame-rate, the following frame uses the skipped frame as a reference for prediction. Thus, a new motion vector and a new macroblock type have to be determined.

In order to determine a new motion vector, a FDVS (forward dominant vector selection) method has been presented by J. Youn and M. Sun ("Motion vector refinement for high-performance transcoding" IEEE Trans. on Multimedia, vol. no.1. pp30-40, March 1999). In an encoder, computational complexity required for estimating a motion vector is as great as 70% of a total computational complexity. Accordingly, the method for determining a new motion vector by using the previously obtained motion vector without performing motion vector estimation again has been presented by Youn and Sun.

FIG. 2 shows a current FDVS method. The FDVS method will be described with reference to an example skipping a frame N-1 in transmission. In the current FDVS method, among four macroblocks of the skipped frame, a motion vector of the macroblock having the greatest overlapped portion with a macroblock to be predicted is defined as a dominant motion vector. The dominant motion vector is defined as a motion vector of the macroblock of the skipped frame.

As depicted in FIG. 2, a macroblock having the greatest overlapped portion with a macroblock predicted by a motion vector $MV_N$ allocated to a macroblock $MB_N$ of a frame N is called $MB_{N-1}$, and a motion vector allocated to the macroblock $MB_{N-1}$ is called $MV_{N-1}$.

Accordingly, a new motion vector $MV'_N$ of the macroblock $MB_N$ of a frame N following after a skipped frame N-1 can be calculated by adding the motion vector $MV_N$ allocated to the macroblock $MB_N$ to the motion vector $MB_{N-1}$ allocated to the macroblock $MV_{N-1}$. Equation 1, below, shows calculating the new motion vector $MV'_N$ of the macroblock $MB_N$ of the frame N.

$$MV'_N = MV_N + MV_{N-1} \quad \text{(Equation 1)}$$

As depicted in Equation 1, in the current FDVS, the previously obtained motion vector is utilized to determine a new motion vector about a frame to be transmitted after the skipped frame. However, by applying Equation 1 without considering a macroblock type of the macroblock $MB_N$ of the frame N, the following problems may occur.

First, when the macroblock $MB_{N-1}$ of the frame N-1 is an 'intra type', a newly allocated motion vector $MV'_N$ is defined by Equation 2, provided below. Herein, a macroblock of the 'intra type' does not have a motion vector, a motion vector $MV_{N-1}$ to be allocated to the macroblock $MB_{N-1}$ is (0,0).

$$MV'_N = MV_N + (0,0) = MV_n \quad \text{(Equation 2)}$$

In Equation 2, the macroblock predicted by the motion vector $MV_N$ in the frame N-2 is matched so as to be the most similar to the macroblock predicted by the motion vector $MV_N$ in the frame N-1. However, since the frame N-1 and the frame N-2 have different characteristics, an optimum matching is not achieved.

Second, when the macroblock $MB_N$ of the frame N is a 'skipped type', in the FDVS method, regardless of a macroblock type of the skipped frame N-1, the macroblock $MB_N$ is determined as the 'skipped type'. However, when a macroblock of the frame N-1 located at the same position with the macroblock $MB_N$ of the frame N is an 'intra type' or an 'inter type', the macroblock $MB_N$ is not coincided with a macroblock type of the frame N-1. In more detail, a reproduced image of the macroblock $MB_N$ decoded by using the frame N-2 as a reference image is different from actual image data of the macroblock $MB_N$.

As described above, by estimating a new motion vector without considering a macroblock type of a frame skipped in transmission and a macroblock type of a frame predicted on the basis of the skipped frame, an image is reproduced through a decoder of a reception block that may be different from an actual image. As a result error may be accumulated in following images, and accordingly picture quality may be deteriorated. Methods and systems are needed that can overcome the above shortcomings associated with the current FDVS method.

SUMMARY OF THE INVENTION

In order to solve the above-mentioned problem, it is an object of the present invention to provide a method for determining a motion vector and a macroblock type capable of accurately determining a motion vector and a macroblock type of a frame transmitted without being skipped in a video transcoder.

A motion vector and macroblock type determining method is provided. The method comprises receiving a high frame-rate video stream having N frames; skipping a frame N-1; allocating a motion vector to a macroblock of frame N according to a macroblock type of the skipped frame N-1; allocating a macroblock type to a macroblock type of frame N according to a macroblock type of the skipped frame N-1; and outputting a low frame-rate video stream.

The macroblock type of the frame N is divided into an inter type and a skipped type. The motion vector of the macroblock of the frame N is determined according to a macroblock type of the skipped frame N-1 when the macroblock of the frame N is an inter type. The macroblock type of the frame N is determined according to a macroblock type of the frame N-1 located at approximately similar position with the macroblock of the frame N when the macroblock of the frame N is a skipped type.

In some embodiments, the method further comprises determining a new motion vector of the macroblock of the frame N when the new macroblock is an inter type. The new motion vector of the macroblock of the frame N is determined so as to be same with a motion vector of the macroblock of the frame N-1 located at approximately a similar position with the macroblock of the frame N.

In accordance with one embodiment, a motion vector and macroblock type determining method comprises determining whether a macroblock of a frame N transmitted after a skipped frame N-1 is an inter type or a skipped type; allocating a new motion vector for the frame N according to a macroblock type of the skipped frame N-1 when a macroblock of the frame N is an intra type; and determining a new macroblock type for the frame N according to a macroblock type of the frame N-1 located at approximately a similar position with the macroblock of the frame N when the macroblock of the frame N is a skipped type.

In certain embodiments, it is determined if a macroblock type of the skipped frame N-1 when the macroblock of the frame N is an intra type; such that an infinite motion vector to the macroblock of the frame N when the macroblock of the skipped frame N-1 is an intra type is allocated; the same motion vector of the macroblock of the frame N when the macroblock of the skipped frame N-1 is a skipped type is allocated; and sum total of a motion vector allocated to macroblock of the frame N and a motion vector allocated to macroblock of the frame N-1 as a new motion vector of the macroblock of the frame N is allocated, when the macroblock of the skipped frame N-1 is an inter type.

In one embodiment, the method further comprises determining a macroblock type for the frame N-1 located at approximately a similar position with the macroblock of the frame N when the macroblock of the frame N is a skipped type; determining the macroblock of the frame N as an intra type when the macroblock of the frame N-1 is an intra type; determining the macroblock of the frame N as a skipped type when the macroblock of the frame N-1 is a skipped type; and determining the macroblock of the frame N as an inter type when the macroblock of the frame N-1 is an inter type.

A motion vector is allocated about the macroblock of the frame N when the macroblock of the frame N is an inter type. The motion vector is allocated so as to be similar to the motion vector of the macroblock of the frame N-1 located at approximately a same position with the macroblock of the frame N.

In accordance with yet another embodiment, a motion vector and macroblock type determining method are provided. The method comprises examining a macroblock of a frame N transmitted after a skipped frame N-1 is an inter type; determining a macroblock type of a frame N-1; and allocating a new motion vector for a macroblock of the frame N, according to the macroblock type of the frame N-1. The macroblock type of the frame N-1 is divided into an intra type, a skipped type and an inter type.

In some embodiments, the new motion vector is determined based on an equation $MV'_N = MV_N + MV_{N-1}$, wherein $MV'_N$ is a motion vector allocated to a macroblock of the frame N, $MV_N$ is a motion vector of a macroblock of the frame N, and $MV_{N-1}$ is a motion vector of a macroblock of the frame N-1. $MV_{N-1}$ has an approximately infinite value when the macroblock of the frame N-1 is an intra type. $MV_{N-1}$ has an approximately 0 value when the macroblock of the frame N-1 is a skipped type.

The new motion vector allocating step comprises allocating an infinite motion vector to a macroblock of the frame N when the macroblock of the skipped frame N-1 is an intra type; allocating a motion vector of the macroblock of the frame N when the macroblock of the skipped frame N-1 is a skipped type; and allocating approximately sum of a motion vector allocated to the macroblock of the frame N and a motion vector allocated to the macroblock of the frame N-1 as a new motion vector for the macroblock of the frame N when the macroblock of the skipped frame N-1 is an inter type.

In accordance with yet another embodiment, a motion vector and macroblock type determining method is provided. The method comprises examining a macroblock of a frame N transmitted after a skipped frame N-1; examining a macroblock type of a frame N-1 located at approximately a similar position with the macroblock of the frame N; and determining if the macroblock type of the frame N is same as the macroblock type of the frame N-1. The macroblock of the frame N is determined as an intra type, when the macroblock of the frame N-1 is an intra type.

The macroblock of the frame N is determined as a skipped type, when the macroblock of the frame N-1 is a skipped type. The macroblock of the frame N is determined as an inter type, when the macroblock of the frame N-1 is an inter type; and a new motion vector of the macroblock of the frame N is allocated. In one embodiment, a motion vector of the macroblock of the frame N-1 located at approximately same position with the macroblock of the frame N is allocated as a new motion vector of the macroblock of the frame N.

These and other embodiments of the present invention will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 3 illustrates an exemplary method, in form of a machine-readable code, for newly allocating a type of a macroblock $MB_N$, in accordance with one embodiment of the invention;

Features, elements, and aspects of the invention that are referenced by the same numerals in different figures represent the same, equivalent, or similar features, elements, or aspects in accordance with one or more embodiments of the system.

DETAILED DESCRIPTION OF THE PREFERRED EMBODIMENT

Hereinafter, a preferred embodiment of a method for determining a motion vector and a macroblock type in accordance with the present invention will be described with reference to accompanying drawings. The method for determining a motion vector and a macroblock type in accordance with the present invention can solve the problems associated with the current FDVS method.

In accordance with one or more embodiments of the invention, when the frame N-1 skipped in transmission includes an intra type macroblock, a new motion vector is defined by Equation 3, below:

$$MV'_N = MV_N + (\infty, \infty) = (\infty, \infty) \quad \text{(Equation 3)}$$

For example, a motion vector (0, 0) is allocated to the intra type macroblock. In one embodiment of the invention, an infinite motion vector is allocated to the macroblock $MB_N$ of the frame N and the macroblock $MB_N$ is determined as the intra type.

When the macroblock $MB_N$ of the frame N transmitted after the skipped frame N-1 is a skipped type, newly allocated macroblock type and motion vector are determined. In some embodiments, regardless of a macroblock type of the skipped frame N-1, a macroblock of the frame N is determined as a skipped type. In certain embodiments of the invention, however, according to a macroblock type of the frame N-1 located at the same position with the macroblock $MB_N$, a macroblock type and a motion vector of the macroblock $MB_N$ are determined.

In more detail, when a macroblock type of the frame N-1 located at the same position with the macroblock $MB_N$ is an intra type, a newly allocated macroblock $MB_N$ is an intra type. When a macroblock type of the frame N-1 is an inter type, a newly allocated macroblock $MB_N$ is an inter type. When a macroblock type of the frame N-1 is a skipped type, a newly allocated macroblock $MB_N$ is a skipped type.

Referring to FIG. 3, a process for newly allocating a type of a macroblock $MB_N$ is provided, when the macroblock $MB_N$ of the frame N is a skipped type. Accordingly, MB_type_$MB_N$ is a type of the macroblock $MB_N$, and MB_type_skipped_frame is a type of a macroblock located at the same position with the macroblock $MB_N$ in the frame N-1.

Figure 1:
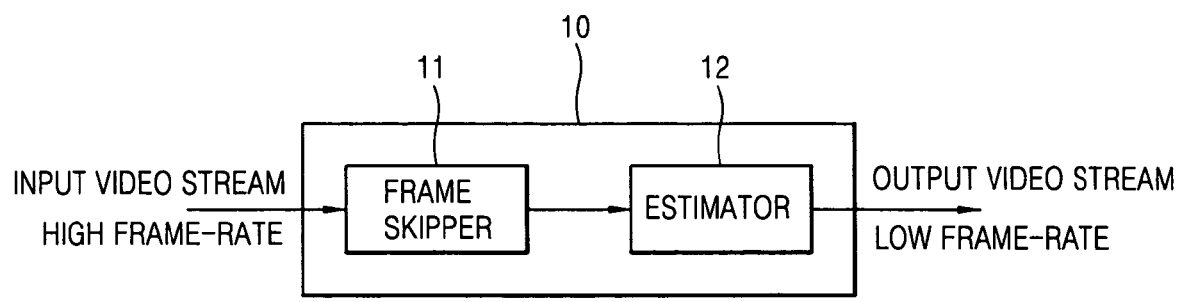
FIG. 1 is a block diagram illustrating operation of a general frame-rate conversion video transcoder.
Figure 2:
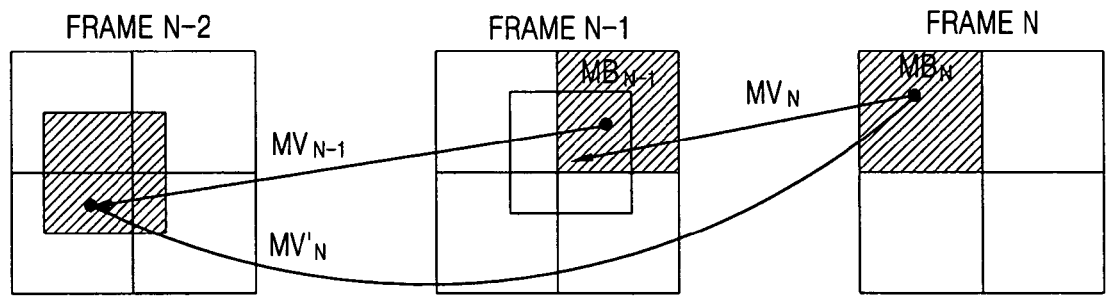
FIG. 2 illustrates an example of a related art FDVS method.
Figure 4:
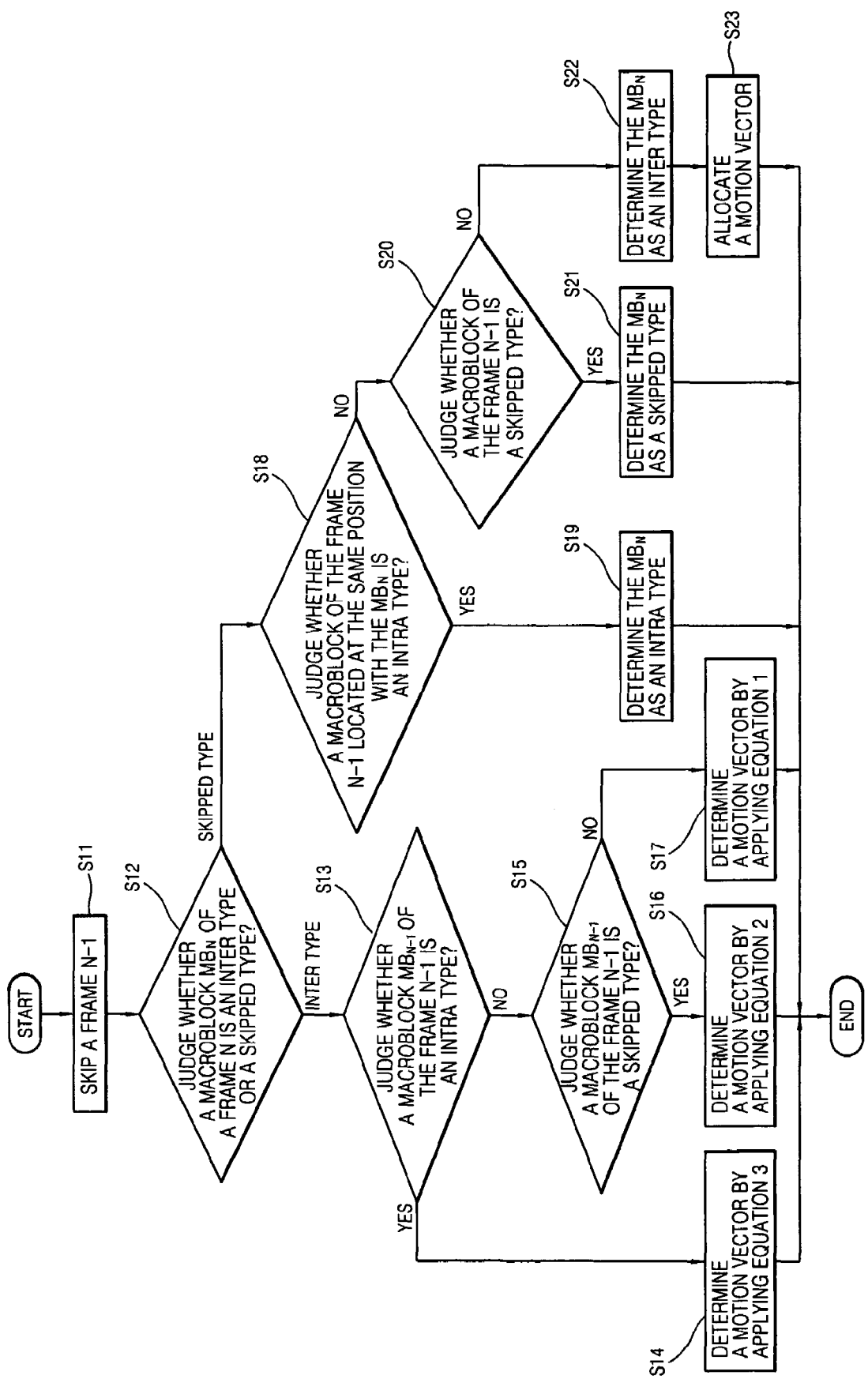
FIG. 4 is a flow chart illustrating a method for determining a motion vector and a macroblock type in accordance with one embodiment of the present invention.

Referring to FIG. 4, a method for determining a motion vector and a macroblock type in accordance with one embodiment of the present invention is provided. When frame N-1 is skipped in the video stream inputted to the frame-rate conversion video transcoder (step S11), a motion vector and a macroblock type of the frame N as the reference frame for predicting the frame N-1 are reallocated.

It is judged whether the macroblock $MB_N$ of the frame N is an inter type or a skipped type (step S12). When the macrolock $MB_N$ is an inter type, a motion vector reallocating process is performed. When the macroblock $MB_N$ is a skipped type, a process for allocating a pertinent macroblock type and a motion vector is performed. When the macroblock $MB_N$ is an intra type, it is considered that the operation has no correlation with a previous frame (i.e., when a scene conversion is performed). Accordingly there is no need to perform the motion vector reallocating process.

In certain embodiments, the motion vector and macroblock type determining process of the macroblock $MB_N$ will be described with two cases (e.g., whether the macroblock $MB_N$ is an inter type or a skipped type). First, if the macroblock $MB_N$ is an inter type, it is determined whether a type of a macroblock $MB_{N-1}$ of the skipped frame N-1 is an intra type (step S13). If the macroblock $MB_{N-1}$ is an intra type, by applying Equation 3, a new motion vector about the macroblock $MB_N$ is determined (step S14). A newly allocated motion vector is an infinite motion vector, in accordance with one or more embodiments.

When the macroblock $MB_{N-1}$ of the skipped frame N-1 is not an intra type, it is judged whether the macroblock $MB_{N-1}$ is a skipped type (step S15). When the macroblock $MB_{N-1}$ is the skipped type, by applying Equation 2, a new motion vector about the macroblock $MB_{N-1}$ is determined (step S16). In more detail, when the macroblock $MB_{N-1}$ is the skipped type, because the macroblock does not have a motion vector, a motion vector $MV_N$ allocated to the macroblock $MB_N$ and the newly allocated motion vector are the same.

When the macroblock $MB_{N-1}$ of the skipped frame N-1 is an inter type, by applying Equation 1 alike the conventional FDVS, a new motion vector about the macroblock $MB_N$ is determined (step S17). If the macroblock $MB_N$ of the frame N is an inter type, in consideration of the macroblock type of the macroblock $MB_{N-1}$ of the skipped frame N-1, a type of the macroblock $MB_N$ is allocated.

In some embodiments, is judged whether a macroblock located at the same position with the macroblock $MB_N$ in the skipped frame N-1 is an intra type (step S18). When the macroblock of the frame N-1 is an intra type, the macroblock $MB_N$ is determined as an intra type (step S19). When the macroblock of the frame N-1 is a skipped type (step S20), the macroblock $MB_N$ is determined as a skipped type (step S21). When the macroblock of the frame N-1 is an inter type, the macroblock $MB_N$ is determined as an inter type (step S22).

In one embodiment, after the macroblock $MB_N$ is determined as the inter type, a motion vector corresponded to the macroblock of the frame N-1 is allocated as a motion vector of the macroblock $MB_N$ (step S23). That is, when the macroblock $MB_N$ is the intra type or the skipped type, there is no need to allocate a new motion vector. However, when the macroblock $MB_N$ is an inter type, a motion vector allocated to the macroblock of the frame N-1 is allocated as a new motion vector.

When the macroblock $MB_N$ is the skipped type, according to a macroblock type of the frame N-1 located at the same position with the macroblock $MB_N$, a type of the new macroblock $MB_N$ is determined. Although a macroblock of a frame transmitted without being skipped through the frame-rate conversion video transcoder is an intra type or a skipped type, the motion vector and macroblock type determining method in accordance with the present invention can be applied.

The present invention is capable of reducing generated bit quantity in a video stream and improving picture quality in reproducing of images. Tables 1 and 2 are for comparing performance of the FDVS method with that of an improved FDVS method in accordance with the present invention. In Tables 1 and 2, video bit sequence MPEG-1 encoded as 30 frames per second is respectively converted into 15 frames and 7.5 frames.

TABLE 1

| Test Image | Conventional FDVS | | Improved FDVS | |
| --- | --- | --- | --- | --- |
| | Generated Bit Quantity (bytes) | Average PSNR (dB) | Generated Bit Quantity (bytes) | Average PSNR (dB) |
| Football | 845061 | 29.19 | 831462 | 29.58 |
| Table Tennis | 467328 | 30.79 | 456531 | 31.37 |
| Garden | 1217779 | 27.93 | 1193164 | 28.43 |

TABLE 2

| Test Image | Conventional FDVS | | Improved FDVS | |
| --- | --- | --- | --- | --- |
| | Generated Bit Quantity (bytes) | Average PSNR (dB) | Generated Bit Quantity (bytes) | Average PSNR (dB) |
| Football | 489008 | 28.99 | 469577 | 29.34 |
| Table Tennis | 302333 | 30.68 | 291734 | 31.16 |
| Garden | 779824 | 27.59 | 764982 | 27.94 |

In Tables 1 and 2, by using football, table tennis and garden images of 120 frames as test images, a conventional FDVS method is compared with the improved FDVS method in accordance with the present invention in the bit generated quantity and picture quality aspects. Herein, a measure of the picture quality comparison is PSNR, for example.

In comparison with the conventional FDVS method, picture quality is improved at maximum 0.6 dB and generated bit quantity is reduced in the improved FDVS method. In more detail, in the FDVS method in accordance with the present invention, it is possible to reduce generated bit quantity and improve picture quality simultaneously.

Figure 5A:
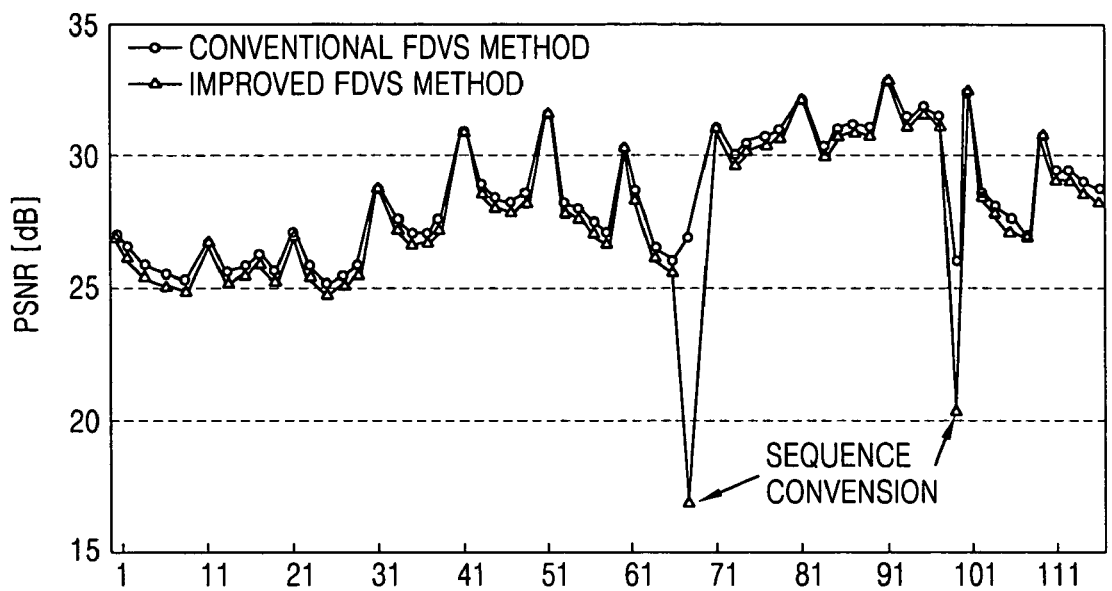
FIGS. 5A and 5B illustrate exemplary graphs for comparing performance of an FDVS method, in accordance with the related art, with that of an improved FDVS method in accordance with one embodiment of the present invention.
Figure 5B:
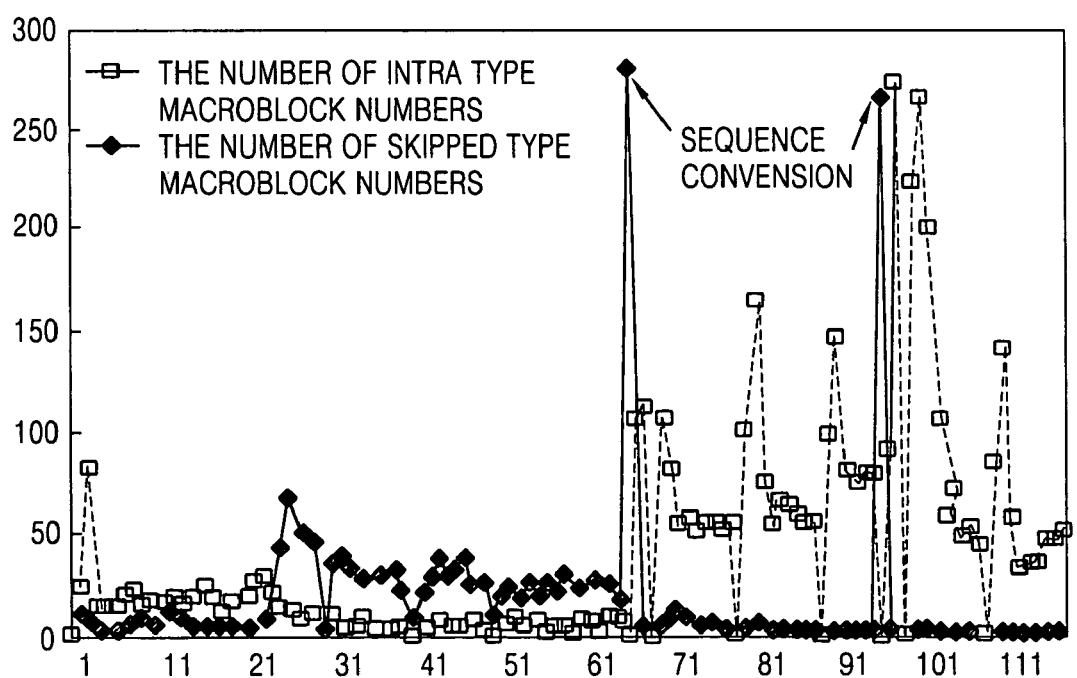

Referring to FIGS. 5A and 5B, table tennis images as MPEG-1 encoded 120 frames by 1.5 Mbps are used as test images, and the test images are converted into 15 frames per second through the frame-rate conversion video transcoder, for example. Sequence conversion occurs in the 68th frame and the 98th frame of the test images. When the sequence conversion occurs, many macroblocks in a P-frame are determined as intra types due to performance lowering of predictive encoding.

FIG. 5A is a graph for comparing PSNR by each frame when the test images are converted into 15 frames per second. In applying of the conventional FDVS method, after the 68th frame and the 98th frame at which the sequence conversion occur are skipped, picture quality is lowered sharply at the 69th frame and the 99th frame, for example. However, in applying the improved FDVS method in accordance with the present invention, the same picture quality can be maintained at the 69th frame and the 99th frame.

FIG. 5B is a graph showing the number of intra type macroblocks and the number of skipped type macroblocks generated at each frame of the test sequences. At the 68th frame and the 98th frame in which sequence conversion occurs, the number of intra type macroblocks is increased sharply. Accordingly, the motion vector and macroblock type determining method considering not only inter type macroblocks but also intra type and skipped type macroblocks is required. As such, by applying the present invention considering a type of each macroblock, picture quality can be improved.

In the motion vector and macroblock type determining method in accordance with the present invention, it is possible to reallocate accurately a motion vector and a macroblock type of a frame transmitted without being skipped through a frame-rate conversion video transcoder. In the motion vector and macroblock type determining method in accordance with the present invention, although performance of predictive encoding such as sequence conversion is lowered, it is possible to improve picture quality and reduce generated bit quantity.

The embodiments described above are to be considered in all aspects as illustrative only and not restrictive in any manner. Thus, other exemplary embodiments, system architectures, platforms, and implementations that can support various aspects of the invention may be utilized without departing from the essential characteristics described herein. These and various other adaptations and combinations of features of the embodiments disclosed are within the scope of the invention. The invention is defined by the claims and their full scope of equivalents.

What is claimed is:

1. A motion vector and macroblock type determining method, the method comprising:
   receiving a high frame-rate video stream having N frames;
   skipping a frame N-1;
   allocating a motion vector to a macroblock of frame N according to a macroblock type of the skipped frame N-1;
   determining a macroblock type of the skipped frame N-1 when the macroblock of the frame N is an intra type;
   allocating a macroblock type to a macroblock type of frame N according to a macroblock type of the skipped frame N-1;
   wherein allocating the motion vector comprises:
   allocating an infinite motion vector to a macroblock of the frame N when the macroblock of the skipped frame N-1 is an intra type;
   allocating a motion vector of the macroblock of the frame N when the macroblock of the skipped frame N-1 is a skipped type; and
   allocating an approximated sum of the motion vector allocated to the macroblock of the frame N and the motion vector allocated to the macroblock of the frame N-1 as a new motion vector for the macroblock of the frame N when the macroblock of the skipped frame N-1 is an inter type; and
   outputting a low frame-rate video stream.

2. The method of claim 1, wherein the macroblock type of the frame N is divided into an inter type and a skipped type.

3. The method of claim 2, wherein the motion vector of the macroblock of the frame N is determined according to the macroblock type of the skipped frame N-1 when the macroblock of the frame N is the inter type.

4. The method of claim 2, wherein the macroblock type of the frame N is determined according to the macroblock type of the frame N-1 located at approximately similar position with the macroblock of the frame N when the macroblock of the frame N is the skipped type.

5. The method of claim 4, further comprising:
   determining a new motion vector of the macroblock of the frame N when the new macroblock is the inter type.

6. The method of claim 5, wherein the new motion vector of the macroblock of the frame N is determined so as to be same with a motion vector of the macroblock of the frame N-1 located at approximately a similar position with the macroblock of the frame N.

7. A motion vector and macroblock type determining method, the method comprising:
   determining whether a macroblock of a frame N transmitted after a skipped frame N-1 is an inter type or a skipped type;

allocating a new motion vector for the frame N according to a macroblock type of the skipped frame N-1 when the macroblock of the frame N is an intra type;

determining a new macroblock type for the frame N according to a macroblock type of the frame N-1 located at approximately a similar position with the macroblock of the frame N when the macroblock of the frame N is the skipped type;

determining a macroblock type of the skipped frame N-1 when the macroblock of the frame N is the intra type;

allocating an infinite motion vector to the macroblock of the frame N when the macroblock of the skipped frame N-1 is an intra type;

allocating the same motion vector of the macroblock of the frame N when the macroblock of the skipped frame N-1 is a skipped type; and allocating a sum total of the motion vector allocated to macroblock of the frame N and the motion vector allocated to macroblock of the frame N-1 as a new motion vector of the macroblock of the frame N when the macroblock of the skipped frame N-1 is an inter type.

8. The method of claim 7, further comprising:

determining the macroblock type for the frame N-1 located at approximately a similar position with the macroblock of the frame N when the macroblock of the frame N is the skipped type;

determining the macroblock of the frame N as the intra type when the macroblock of the frame N-1 is the intra type;

determining the macroblock of the frame N as the skipped type when the macroblock of the frame N-1 is the skipped type; and determining the macroblock of the frame N as the inter type when the macroblock of the frame N-1 is the inter type.

9. The method of claim 8, further comprising:

allocating a motion vector about the macroblock of the frame N when the macroblock of the frame N is the inter type.

10. The method of claim 9, wherein the motion vector is allocated so as to be similar to the motion vector of the macroblock of the frame N-1 located at approximately a same position with the macroblock of the frame N.

11. A motion vector and macroblock type determining method, the method comprising:

examining a macroblock of a frame N transmitted after a skipped frame N-1 that is an inter type;

determining a macroblock type of a frame N-1;

allocating a new motion vector for the macroblock of the frame N, according to the macroblock type of the frame N-1, wherein allocating the new motion vector comprises:

allocating an infinite motion vector to the macroblock of the frame N when the macroblock of the skipped frame N-1 is an intra type;

allocating a motion vector of the macroblock of the frame N when the macroblock of the skipped frame N-1 is a skipped type; and allocating an approximated sum total of the motion vector allocated to the macroblock of the frame N and the motion vector allocated to the macroblock of the frame N-1 as a new motion vector for the macroblock of the frame N when the macroblock of the skipped frame N-1 is the inter type.

12. The method of claim 11, wherein the macroblock type of the frame N-1 is divided into the intra type, the skipped type and the inter type.

13. The method of claim 11, wherein the new motion vector is determined based on an equation $MV'_N = MV_N + MV_{N-1}$, wherein $MV'_N$ is a motion vector allocated to a macroblock of the frame N, $MV_N$ is a motion vector of a macroblock of the frame N, and $MV_{N-1}$ is a motion vector of a macroblock of the frame N-1.

14. The method of claim 13, wherein $MV_{N-1}$ has an approximately infinite value when the macroblock of the frame N-1 is the intra type.

15. The method of claim 13, wherein $MV_{N-1}$ has an approximately 0 value when the macroblock of the frame N-1 is the skipped type.

16. A motion vector and macroblock type determining method, the method comprising:

examining a macroblock of a frame N transmitted after a skipped frame N-1;

examining a macroblock type of a frame N-1 located at approximately a similar position with the macroblock of the frame N;

determining if the macroblock type of the frame N is same as the macroblock type of the frame N-1;

allocating an infinite motion vector to a macroblock of the frame N when the macroblock of the skipped frame N-1 is an intra type;

allocating a motion vector of the macroblock of the frame N when the macroblock of the skipped frame N-1 is a skipped type; and to allocating an approximated sum total of the motion vector allocated to the macroblock of the frame N and the motion vector allocated to the macroblock of the frame N-1 as a new motion vector for the macroblock of the frame N when the macroblock of the skipped frame N-1 is an inter type.

17. The method of claim 16, wherein the macroblock of the frame N is determined as an intra type, when the macroblock of the frame N-1 is the intra type.

18. The method of claim 16, wherein the macroblock of the frame N is determined as a skipped type, when the macroblock of the frame N-1 is the skipped type.

19. The method of claim 16, further comprising:

determining the macroblock of the frame N as an inter type, when the macroblock of the frame N-1 is an inter type; and allocating a new motion vector of the macroblock of the frame N.

20. The method of claim 19, wherein a motion vector of the macroblock of the frame N-1 located at approximately same position with the macroblock of the frame N is allocated as a new motion vector of the macroblock of the frame N.

* * * * *